(12) United States Patent
Belinky et al.

(10) Patent No.: US 6,202,909 B1
(45) Date of Patent: Mar. 20, 2001

(54) STORABLE HITCH MOUNTED CARGO CARRIER

(75) Inventors: Jacob S. Belinky, Carleton; David A. Young, Plymouth, both of MI (US)

(73) Assignee: Draw-Tite Corporation, Canton, MI (US)

( * ) Notice: Subject to any disclaimer, the term of this patent is extended or adjusted under 35 U.S.C. 154(b) by 0 days.

(21) Appl. No.: 09/304,896

(22) Filed: May 4, 1999

(51) Int. Cl.⁷ ........................................ B60R 9/00
(52) U.S. Cl. .................. 224/524; 224/522; 224/523; 224/529
(58) Field of Search ................... 224/524, 523, 224/525, 529, 518, 519, 522, 527

(56) References Cited

U.S. PATENT DOCUMENTS

| | | |
|---|---|---|
| 4,906,015 | 3/1990 | LaCroix et al. . |
| 5,038,983 | 8/1991 | Tomososki . |
| 5,106,002 * | 4/1992 | Smith et al. ............... 224/506 |
| 5,377,886 | 1/1995 | Sickler . |
| 5,427,289 | 6/1995 | Ostor . |
| 5,460,304 * | 10/1995 | Porter et al. .............. 224/521 |
| 5,570,826 * | 11/1996 | Garbes et al. ............. 224/524 |
| 5,586,702 | 12/1996 | Sadler . |
| 5,620,126 * | 4/1997 | Janek ........................ 224/527 |
| 5,996,869 * | 12/1999 | Belinky et al. ............ 224/524 |

* cited by examiner

Primary Examiner—Gregory M. Vidovich
Assistant Examiner—Maerena W. Brevard
(74) Attorney, Agent, or Firm—Reising, Ethington, Barnes, Kisselle, Learman & McCullosh

(57) ABSTRACT

A cargo carrier (10) has a separable drawbar (22) and platform (20) for facilitating ease of storage when not in use. The drawbar (22) is mountable to a vehicle hitch and the platform (20) is mounted onto the drawbar (22) via the fastening of a single manually operated knob (74).

8 Claims, 5 Drawing Sheets

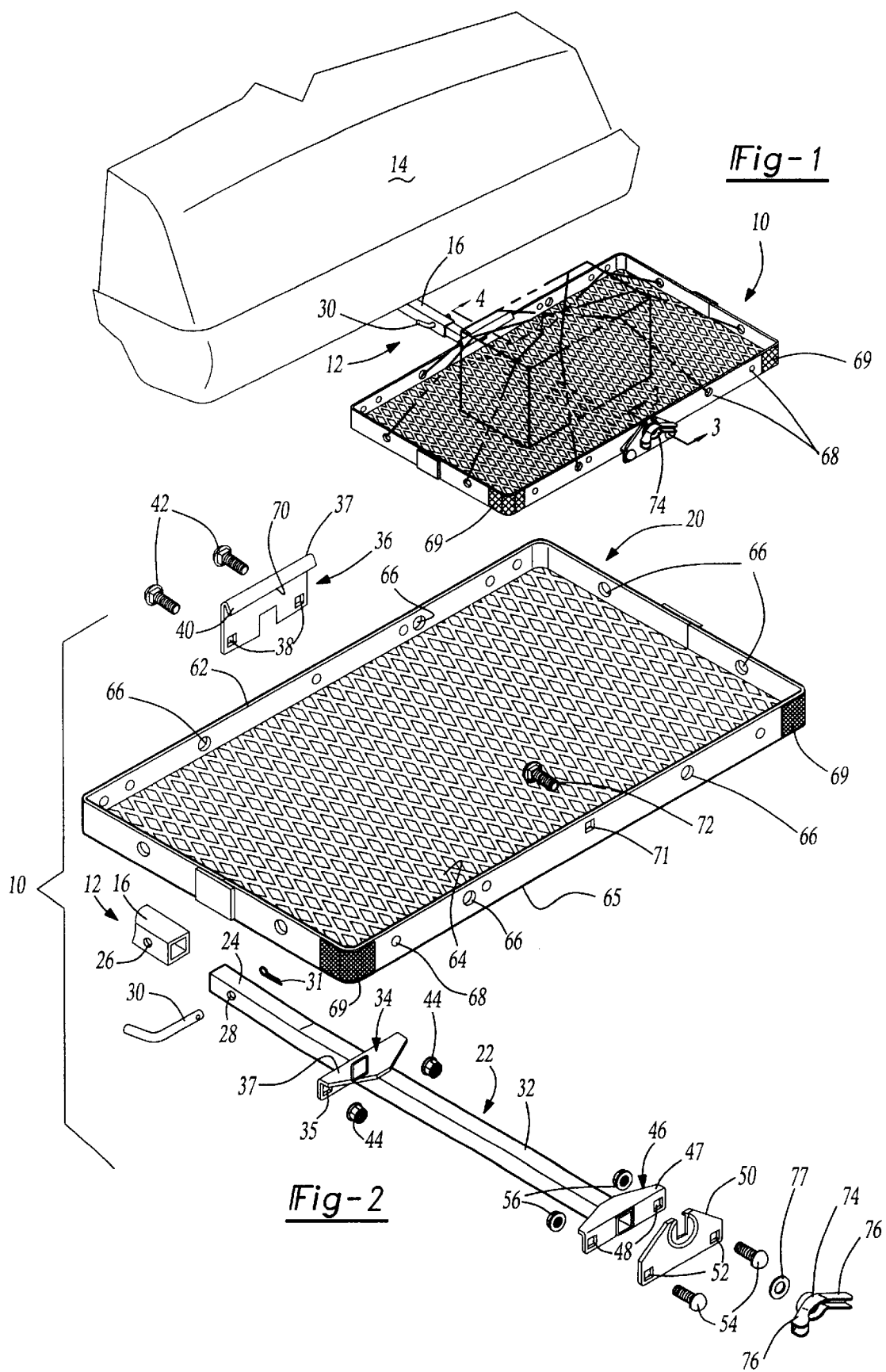

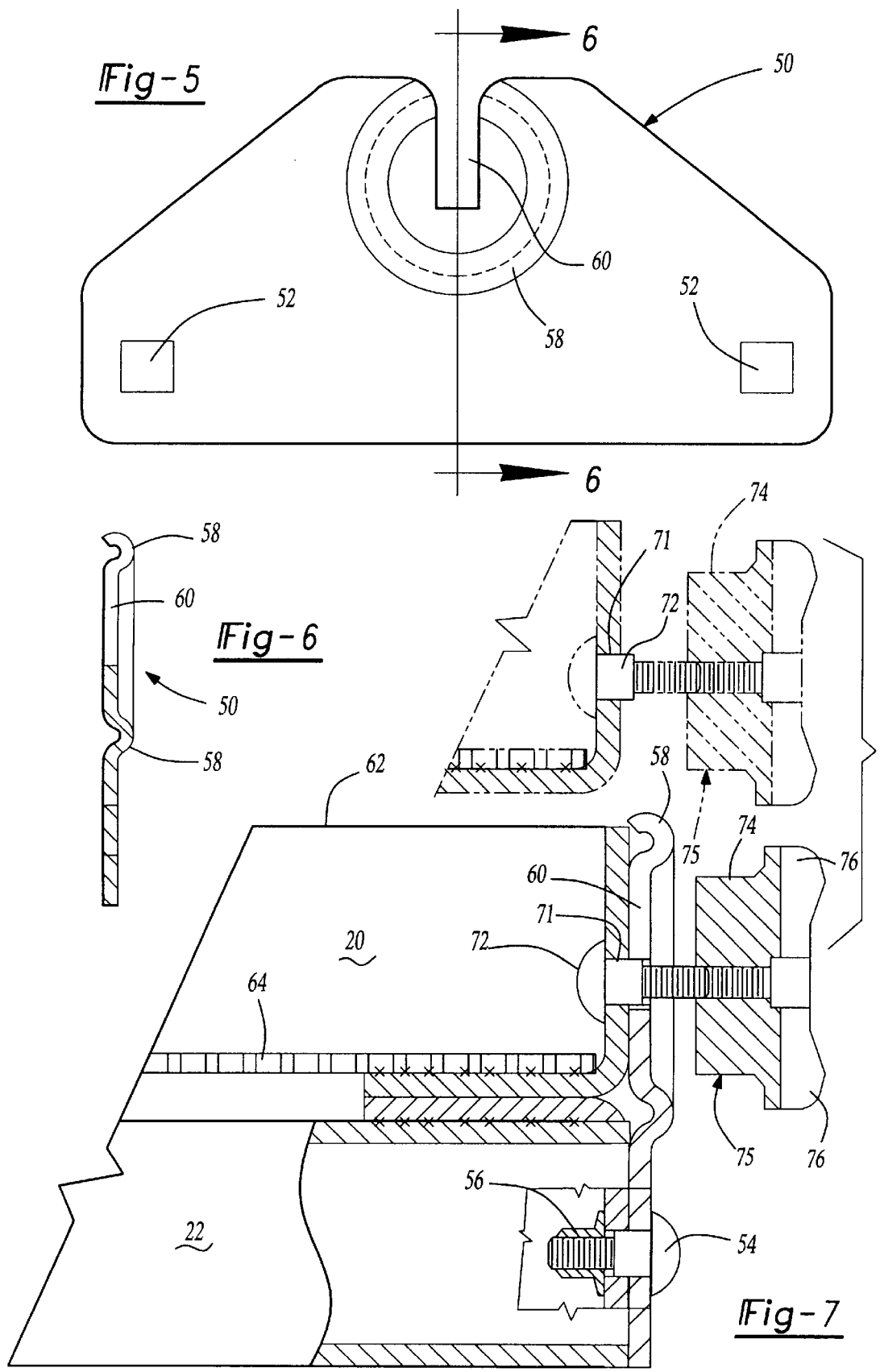

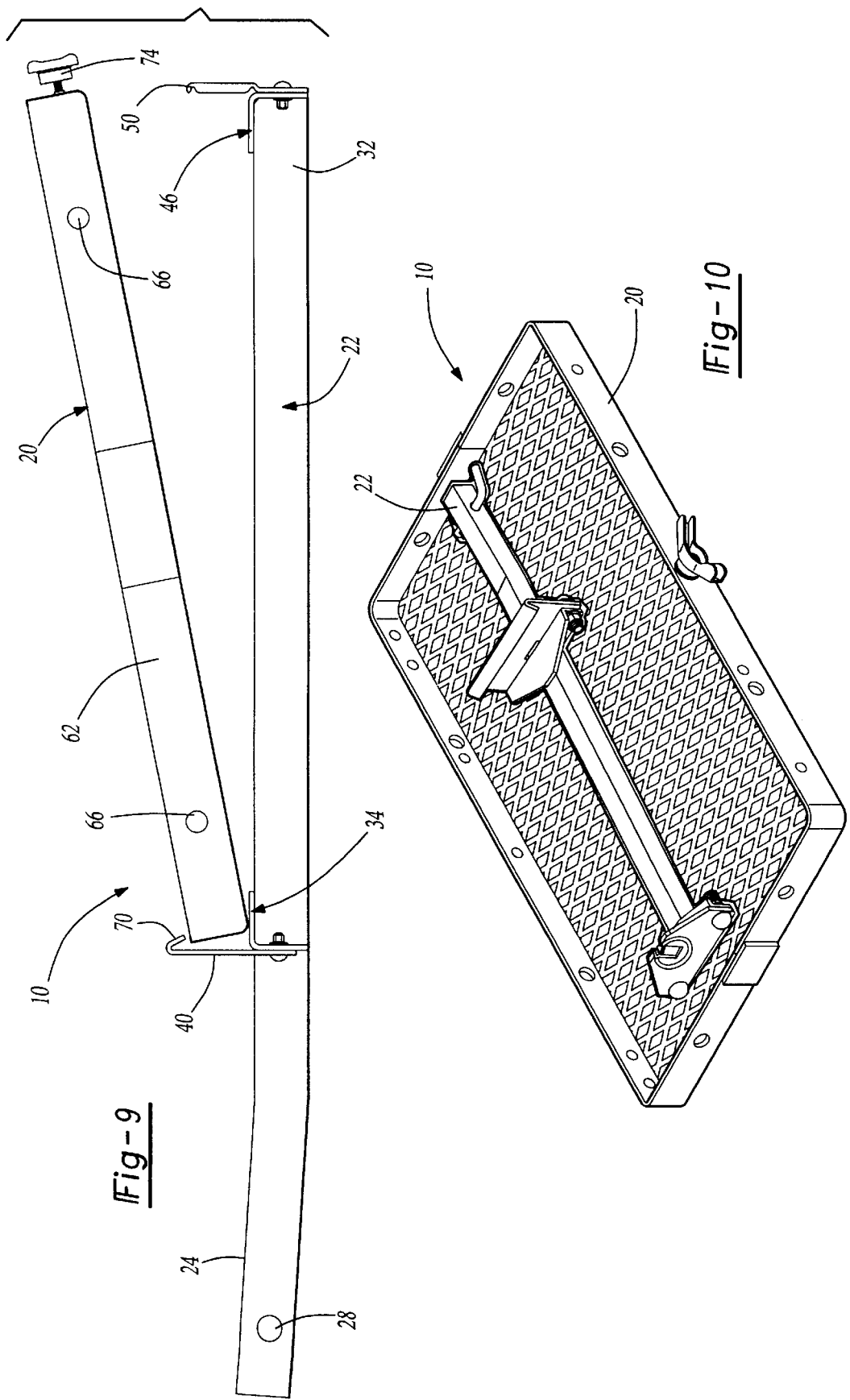

US 6,202,909 B1

STORABLE HITCH MOUNTED CARGO CARRIER

TECHNICAL FIELD

The field of this invention relates to cargo carriers for vehicles and, in particular, to a hitch mounted carrier that can be disassembled and stored in the vehicle when not in use.

BACKGROUND OF THE DISCLOSURE

Article carriers are widely employed to expand the carrying capacity of vehicles while maintaining comfort within the passenger compartment. Rooftop carriers are well known and popular because they are unobtrusive and self-storing on the roof when not in use. However, access to a roof top carrier can be awkward and cumbersome, particularly with taller vehicles. As such, the inconvenience of rooftop carriers deters the everyday use of them. Moreover, rooftop carriers are dependent upon the structural strength of the vehicle roof and therefore may be limited in the carrying capacity.

Rear mounted cargo carriers have also been employed to increase the cargo capacity of the vehicle. While rear mounted cargo carriers undesirably stick out from the end of a vehicle when not in use, they have strong mounts to the vehicle and can hold relatively heavy and awkward loads compared to roof mounted carriers. Furthermore, the loading and unloading of a rear cargo carrier is extremely convenient compared to a roof mounted carrier.

On the other hand, many rear-mounted carriers require specialized mounting hardware to secure the carrier to the vehicle resulting in undesirable added structure and cost. Furthermore, many of these rear cargo platforms extend horizontally from the hitch assembly and do not provide for adequate clearance with the ground. This inadequate clearance can further be aggravated by the loaded condition where the extra cargo weight in the rear tilts the entire motor vehicle to allow the rear cargo carrier to tilt toward the ground. In extreme cases, the carrier can be damaged as the vehicle moves along in a loaded condition if there is contact of the platform with the ground. In addition, rear cargo platforms are bulky and are not amenable to storage within the vehicle interior when they are not in use.

What is desired is a cargo carrier that can be easily dismounted and disassembled to be stored within the vehicle interior when not in use. What is also desired is a rear mounted cargo carrier that is positioned to maintain adequate vertical clearance from the ground.

SUMMARY OF THE DISCLOSURE

In accordance with one aspect of the invention, a cargo carrier is constructed for mounting to a hitch sleeve of a vehicle to position the cargo carrier proximate the rear of the vehicle. The cargo carrier includes a drawbar having a front end constructed to be removably mounted to the vehicle hitch sleeve. The rear section of the drawbar includes a rear first bracket and a second bracket affixed on the drawbar between the front end and the rear end. A cargo platform is removably mounted to the first and second brackets.

Preferably, the rear bracket has a slot extending from an edge, preferably its upper edge, for receiving a fastener that passes through a rear rail of the platform. A manually operated knob engages the fastener and is retained laterally against the bracket by an embossment at the side of the slot. Preferably, the embossment is arcuate in shape to substantially surround the knob when the knob is fully fastened to the fastener. Preferably, the knob has a pair of manually operated wings and a threaded hub that threads onto the fastener. When loosened, the knob allows the fastener to laterally exit the slot. Preferably the slot is vertically oriented and the fastener is vertically lifted out of the slot.

Preferably, the second bracket has an upper lip that engages a front section of the rail of the platform and allows the rail to be pivotably moved thereunder to disengage therefrom when the fastener laterally exits the slot of the first bracket.

In accordance with another aspect of the invention, a cargo carrier is constructed to be mounted to a hitch sleeve of a vehicle. The carrier includes a drawbar removably mounted to the hitch sleeve. A cargo platform is removably mounted onto the drawbar by a releasable fastener. When the fastener is loosened, the platform can be disconnected from the drawbar such that the drawbar and cargo platform can facilitate storage in a motor vehicle as separate members.

Preferably, the releasable fastener is a single manually operated fastener located axially with the drawbar and connects the edge rail of the cargo platform to the drawbar. Preferably the single fastener is a threaded manually operated knob that engages a threaded fastener element to lock the rear rail section of the platform onto a rear bracket member attached to the drawbar.

In this fashion, a cargo carrier can be mounted onto the rear of a motor vehicle and provide convenience of rear mounted carriers but can be easily disassembled into a separate platform and drawbar when not in use to facilitate ease in storage of the carrier.

BRIEF DESCRIPTION OF THE DRAWINGS

Reference now is made to the accompanying drawings in which:

FIG. 1 is a perspective view of an assembled cargo carrier illustrating an embodiment of the invention;

FIG. 2 is an exploded view of the cargo carrier shown in FIG. 1;

FIG. 5 is an enlarged plan view of the rear bracket member shown in FIG. 2;

FIG. 6 is a cross-sectional view taken along lines 6—6 shown in FIG. 5;

FIG. 7 is a view similar to FIG. 3 showing the fastener in the loosened position;

FIG. 9 is a side elevational view showing the platform being disassembled from the drawbar;

FIG. 10 is a perspective view showing the two components in a separate and storable condition.

DETAILED DESCRIPTION OF THE PREFERRED EMBODIMENT

Figure 3:
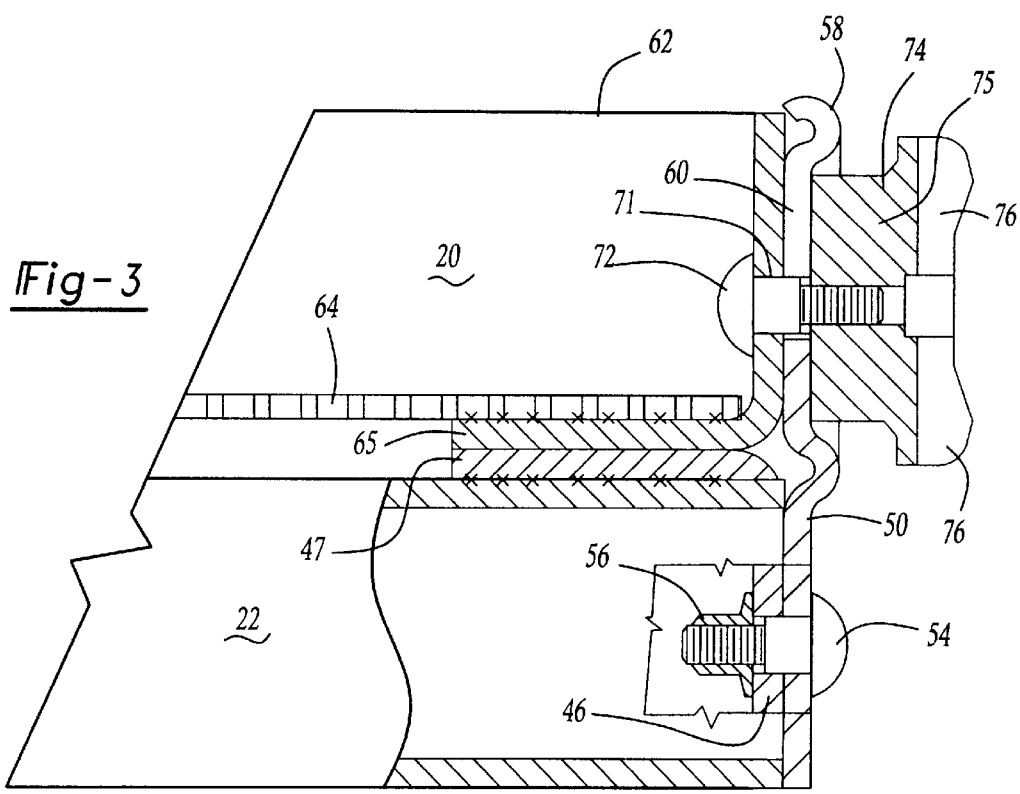
FIG. 3 is an enlarged cross-sectional and partially segmented view taken along lines 3—3 shown in FIG. 1.

Referring now to FIG. 1, a cargo carrier 10 is mountable to a hitch assembly 12 of a motor vehicle 14. The hitch assembly 12 is a receiver style hitch having a sleeve 16 fixedly mounted to the vehicle in a well-known fashion. The hitch assembly extends rearwardly from the vehicle in order to position the cargo carrier 10 proximate the rear end of the vehicle 14 for convenient access and loading of the carrier 10. In accordance with the present invention, the cargo carrier 10 may be removed from the hitch to allow use of the hitch 12 for other conventional towing purposes.

As shown more clearly in FIGS. 2 and 10, the cargo carrier 10 generally includes a platform 20 removably connected to a drawbar 22. The drawbar has a front end 24 constructed to be matingly received with the hitch sleeve 16. The hitch sleeve 16 and front end 24 include alignable apertures 26 and 28 for receiving a locking pin 30 to secure the drawbar 22 within the hitch sleeve 16. The clip 31 retains the pin 30 in place. As a result, the drawbar 22 extends longitudinally from the hitch 12 rearwardly from the vehicle 14. The drawbar 22 has a rear section 32 with a rising cant, as illustrated clearly in FIG. 9, with respect to the front end 24. The cant is preferably about 3 degrees to offset the normal cant of vehicle 14 when the cargo carrier is loaded with weight. This 3-degree rise of the drawbar section 32 is designed to maintain adequate vertical clearance of the cargo carrier platform 20 relative to the ground when the carrier is loaded.

The drawbar has a front bracket 34 welded to the drawbar. The bracket 34 has a laterally extending upper surface 37 to provide lateral support to the cargo platform 20. The bracket 34 also has two laterally positioned apertures 36. A bracket lip member 40 has aligned apertures 38 that allows the bracket 34 to be affixed to a bracket lip 70 via carriage bolts 42 and lock nuts 44 as shown clearly in FIG. 4.

As illustrated in FIGS. 2, 3 and 7, the rear end of the drawbar has a rear bracket 46 welded thereon. Bracket 46 similarly has a laterally extending upper surface 47 to provide lateral support to the cargo platform 20. The bracket 46 also has two laterally positioned apertures 48. An end bracket 50 has aligned apertures 52 that allows the end bracket 50 to be affixed to the rear bracket 46 via carriage bolts 54 and lock nuts 56. Reference now is made to FIGS. 5 and 6, where it is shown that the end bracket 50 also has a centrally located vertically extending slot 60 that opens at the upper edge of the end bracket. An arcuate embossment 58 surrounds the slot 60.

Figure 4:
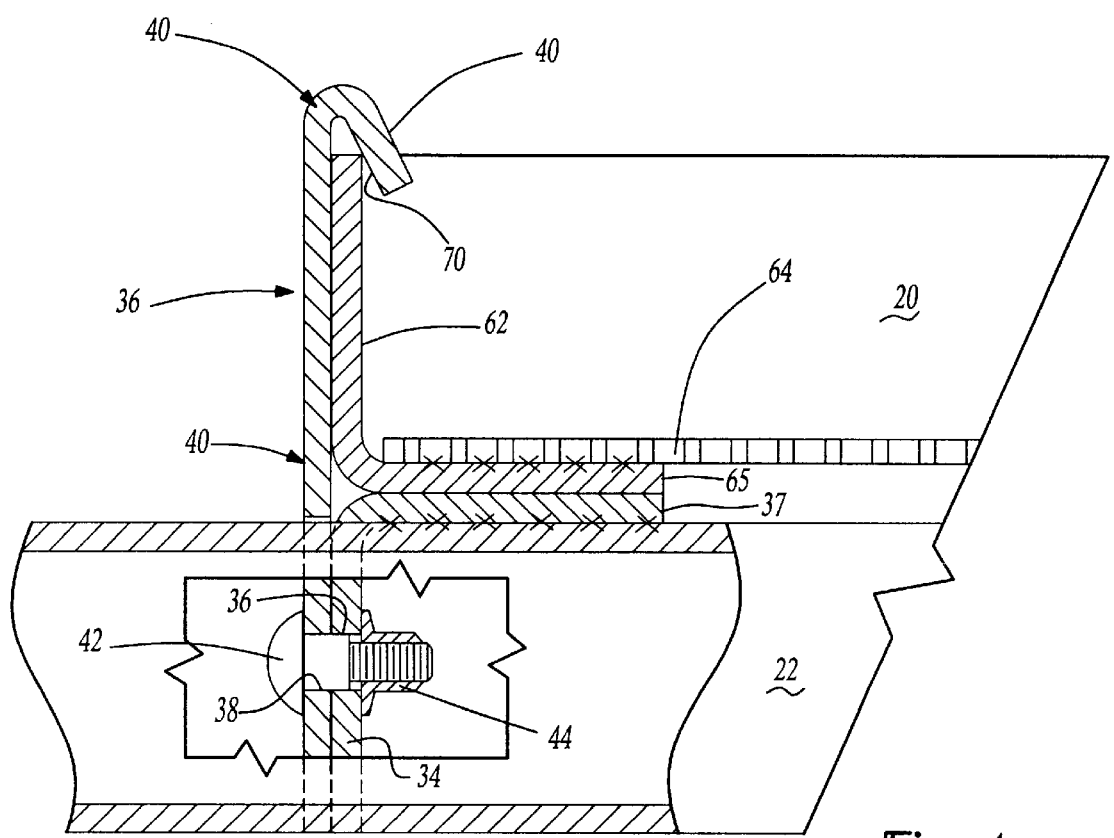
FIG. 4 is an enlarged cross-sectional and partially segmented view taken along lines 4—4 shown in FIG. 1.

The platform 20 includes a rectangular frame or rail 62 with a metal mesh bottom 64. The metal mesh bottom 64 prevents water from accumulating on the platform 20 although a substantially solid bottom could be utilized. The periphery of the mesh bottom 64 is preferably welded to the inner extending lower flange 65 of the rail 62 as illustrated in FIGS. 3 and 4. The rail 62 may have intervally spaced tie down holes 66 therethrough and license plate relocation holes 68 therethrough. Light reflectors 69 are attached to the outer rear corners of the rail 62. Referring now to FIGS. 1, 3 and 4, the platform 20 is mounted onto the drawbar 22. The front section of rail 62 fits under the lip 70 of bracket lip member 40. A rear section of rail 62 has an aperture 71 that receives bolt 72. Bolt 72 extends through slot 60 and engages a threaded knob 74. The knob 74 is preferably molded polypropylene with two manually operated wings 76 and a threaded central hub 75 with an optional nylon stop nut 77 shown in FIG. 2. The knob 74 is tightened onto the bolt 72 such that the knob hub 75 is retained within the embossment 58 to prevent the knob 74 and bolt 72 from vertically lifting out of slot 60.

Figure 8:
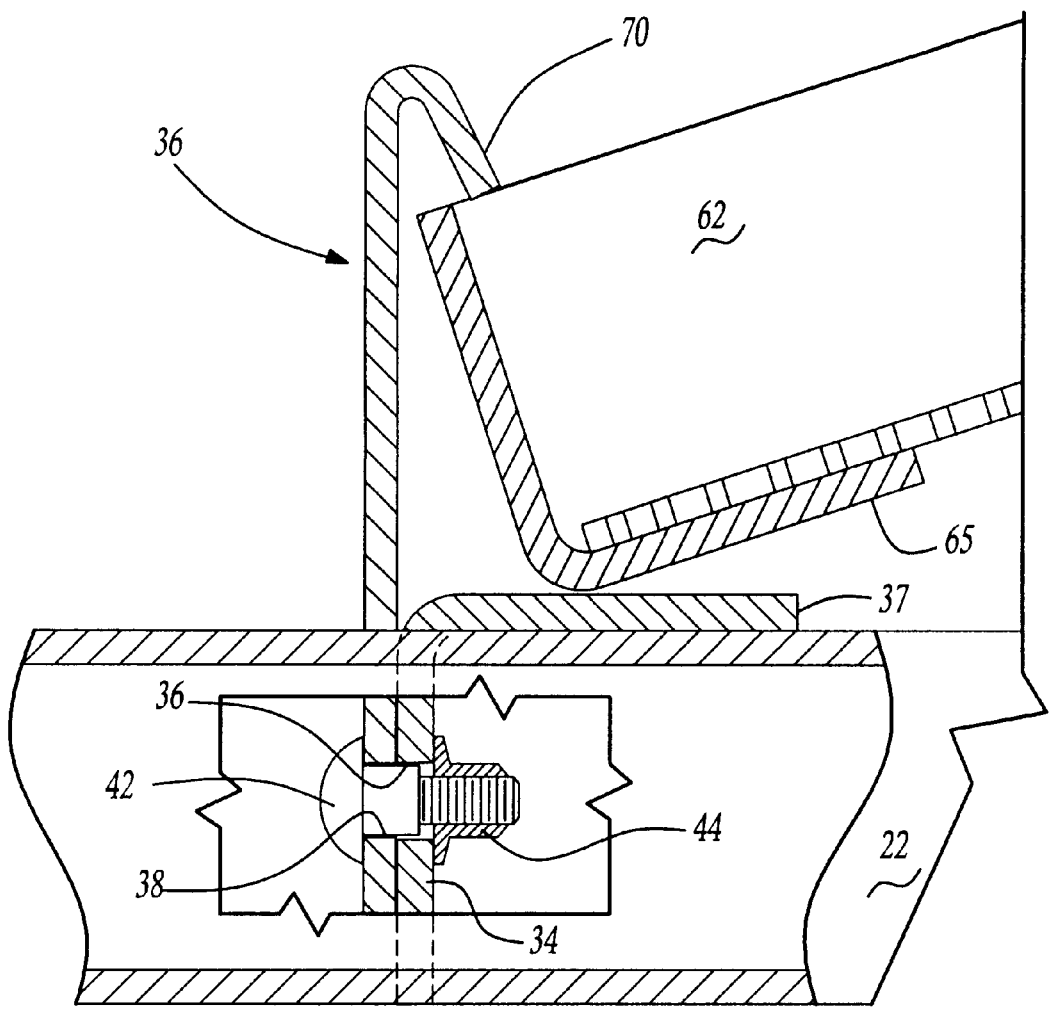
FIG. 8 is a view similar to FIG. 4 showing the cargo carrier being pivoted under the front lip of the front mounting bracket on the drawbar.

When the cargo carrier 10 is not in use, the carrier 10 may easily be disassembled and removed from the hitch and stored inside the vehicle. The knob 74 is loosened such that the hub 75 (and any optional washer 77) becomes disengaged from and clears the embossment 58 as shown in FIG. 7. The platform 20 is then free to be lifted at its rear rail where the bolt 72 vertically slides out from slot 60 as shown in the upper phantom portion in FIG. 7. In the lifted position, the front rail section tilts and becomes disengaged from the lip 70 as shown in FIGS. 8 and 9. The platform 20 becomes disengaged from the drawbar 22. The drawbar 22 may then be disconnected from the hitch and the platform 20 and drawbar 22 may be conveniently positioned and stored in a trunk or rear cargo section of a motor vehicle as illustrated in FIG. 10.

In this fashion, the platform 20 and drawbar 22 can be easily connected and disconnected by operation of a single knob 74. The cargo carrier 10 easily comes apart into two major pieces for easy storage and is easily assembled to facilitate its use on hitch 12.

Variations and modifications are possible without departing from the scope and spirit of the present invention as defined by the appended claims.

The embodiments in which an exclusive property or privilege is claimed are defined as follows:

1. A cargo carrier constructed to be mounted to a hitch sleeve of a vehicle to position said cargo carrier proximate the rear of the vehicle; said cargo carrier comprising:

a drawbar having a first end construction to be removably mounted to the vehicle hitch sleeve and a rear distal end that includes a first bracket;

a cargo platform having a rear end removably attachable to said first bracket;

a second bracket affixed on an intermediate section of said drawbar between said first end and said rear distal end;

said second bracket removably connectable to said front end of said cargo platform;

said first bracket having a slot extending from an edge thereof for receiving a fastener that passes through a rear rail of said platform;

a manually operated knob engaging said fastener; and an embossment at a side of said slot and said bracket for preventing said knob and fastener from laterally disengaging from said slot when said knob is fully fastened onto said fastener.

2. A cargo carrier as defined in claim 1 further comprising:

said knob having a pair of manually operated wings and a threaded hub that threads onto said fastener.

3. A cargo carrier as defined in claim 2 further comprising:

said embossment being arcuate in shape to substantially surround said knob when fully fastened to said fastener.

4. A cargo carrier as defined in claim 3 further comprising:

said slot extending vertically down from a top edge of said first bracket and said fastener vertically moves to engage or disengage from said slot.

5. A cargo carrier as defined in claim 1 further comprising:

said slot extending vertically down from a top edge of said first bracket and said fastener vertically moves to engage or disengage from said slot.

6. A cargo carrier as defined in claim 5 further comprising:

said second bracket having an upper lip that engages a front rail of said platform and that allows said rail to pivotally move thereunder and disengage therefrom when said fastener laterally exits said slot of said first bracket.

7. A cargo carrier constructed to be mounted to a hitch sleeve of a vehicle; said cargo carrier comprising:

a drawbar having a first end adapted to be selectively mounted to the hitch sleeve;

a cargo platform removably mounted onto said drawbar by a releasable fastener device such that said cargo platform is disconnectable from said drawbar such that said drawbar and cargo platform can be stored in the vehicle as separate members;

said releasable fastener device being a single operated fastener located axially with said drawbar and connecting an edge rail of said cargo platform to said drawbar; and said drawbar having a front bracket with a top lip engaging a front rail section of said cargo platform and said single operated fastener clamps a rear rail section of said cargo platform.

8. A cargo carrier constructed to be mounted to a hitch sleeve of a vehicle; said cargo carrier comprising:

a drawbar having a first end adapted to be selectively mounted to the hitch sleeve;

a cargo platform removably mounted onto said drawbar by a releasable fastener device such that said cargo platform is disconnectable from said drawbar such that said drawbar and cargo platform can be stored in the vehicle as separate members;

said releasable fastener device being a single operated fastener located axially with said drawbar and connecting an edge rail of said cargo platform to said drawbar; and said single operated fastener being a threaded manually operated member, threadably engaging a complementary threaded fastener element to lock said rear rail section onto a rear bracket member attached to said drawbar.

* * * * *